US012795294B2

(12) United States Patent
Lai

(10) Patent No.: US 12,795,294 B2
(45) Date of Patent: Nov. 10, 2026

(54) VIBRATION ISOLATOR AND AUDIO DEVICE

(71) Applicant: CENTURY STEP AUDIOTECH LIMITED, Hong Kong (CN)

(72) Inventor: Yuk Shing Lai, Hong Kong (CN)

(73) Assignee: CENTURY STEP AUDIOTECH LIMITED, Hong Kong (CN)

( * ) Notice: Subject to any disclaimer, the term of this patent is extended or adjusted under 35 U.S.C. 154(b) by 0 days.

(21) Appl. No.: 19/572,930

(22) Filed: Mar. 20, 2026

(65) Prior Publication Data

US 2026/0230744 A1 Aug. 6, 2026

Related U.S. Application Data

(63) Continuation of application No. PCT/CN2024/129163, filed on Oct. 31, 2024.

(60) Provisional application No. 63/596,742, filed on Nov. 7, 2023.

(30) Foreign Application Priority Data

Oct. 23, 2024 (CN) ......................... 202411482892.3

(51) Int. Cl.
*H04R 1/02* (2006.01)
*H04R 1/28* (2006.01)

(52) U.S. Cl.
CPC ........... *H04R 1/288* (2013.01); *H04R 1/2896* (2013.01)

(58) Field of Classification Search
CPC .............................. H04R 1/288; H04R 1/2896
USPC ................................. 381/353, 354, 355, 356
See application file for complete search history.

(56) References Cited

U.S. PATENT DOCUMENTS

| | | | | |
|---|---|---|---|---|
| 2,924,420 A * | 2/1960 | Fink | F16F 15/02 | 248/562 |
| 3,779,337 A * | 12/1973 | Gregory | H04R 1/025 | 181/151 |
| 3,814,412 A * | 6/1974 | Britton | F16F 1/44 | 267/152 |

(Continued)

FOREIGN PATENT DOCUMENTS

| | | |
|---|---|---|
| CN | 207854092 U | 9/2018 |
| CN | 208463701 U | 2/2019 |

(Continued)

*Primary Examiner* — William J Deane, Jr.
(74) *Attorney, Agent, or Firm* — The Webb Law Firm

(57) ABSTRACT

A vibration isolator, configured to be installed between an audio apparatus and a substrate for decoupling vibrations transmitted from the audio apparatus to the substrate and separating vibrations transmitted from an external environment to the substrate from the audio apparatus and including: a base assembly and a support assembly, a movable mounting part, and a damping part. The support assembly is installed in the base assembly, the base assembly is configured to be placed on the support apparatus, and the support assembly is configured to support the audio apparatus. The movable mounting part is mounted in the base assembly, and the support assembly is movably or elastically connected with the base assembly through the movable mounting part. The damping part is installed between the base assembly and the support assembly and configured to dampen the support assembly during a movement of the support assembly relative to the base assembly.

18 Claims, 11 Drawing Sheets

(56) References Cited

U.S. PATENT DOCUMENTS

| | | | | | |
|---|---|---|---|---|---|
| 4,643,385 | A * | 2/1987 | Sandercock | F16F 15/005 248/550 |
| 4,658,174 | A * | 4/1987 | Albert | G01L 1/106 73/DIG. 1 |
| 4,884,655 | A | 12/1989 | Freadman et al. | |
| 5,178,357 | A * | 1/1993 | Platus | F16F 3/026 248/619 |
| 5,890,569 | A * | 4/1999 | Goepfert | G01C 21/166 267/136 |
| 6,035,980 | A * | 3/2000 | Fujita | F16F 15/03 267/136 |
| 6,422,544 | B1 * | 7/2002 | Ohlsson | F16F 15/022 267/136 |
| 7,640,868 | B2 | 1/2010 | Morrsion et al. | |
| 8,215,245 | B2 | 7/2012 | Morrsion et al. | |
| 9,423,000 | B2 | 8/2016 | Tan et al. | |
| 9,860,630 | B2 * | 1/2018 | Strange | H04R 1/26 |
| 9,863,495 | B1 * | 1/2018 | Wakeen | F16F 15/021 |
| 9,920,811 | B1 | 3/2018 | Morrsion | |
| 10,154,338 | B2 | 12/2018 | Strange et al. | |
| 10,575,078 | B2 | 2/2020 | Slaton | |
| 11,495,269 | B2 | 11/2022 | Morrison | |
| 11,527,227 | B2 * | 12/2022 | Gernhart | G10K 11/16 |
| 2014/0177841 | A1 * | 6/2014 | Hazzani | H04W 12/04 380/270 |
| 2014/0197330 | A1 * | 7/2014 | Peijster | B82Y 10/00 248/610 |
| 2014/0270304 | A1 * | 9/2014 | Pieklik | H04R 1/023 381/334 |
| 2017/0306851 | A1 | 10/2017 | Jiang et al. | |
| 2018/0073592 | A1 | 3/2018 | Morrsion | |
| 2020/0045447 | A1 * | 2/2020 | Zhang | H04R 7/16 |
| 2022/0316550 | A1 * | 10/2022 | Jang | F16F 3/04 |
| 2023/0249779 | A1 * | 8/2023 | Kishi | B62K 21/14 74/551.1 |

FOREIGN PATENT DOCUMENTS

| | | | |
|---|---|---|---|
| CN | 209787414 | U | 12/2019 |
| CN | 210868133 | U | 6/2020 |
| CN | 213342595 | U | 6/2021 |
| CN | 213725684 | U | 7/2021 |
| CN | 115565554 | A | 1/2023 |
| CN | 116624554 | A | 8/2023 |
| EP | 2165090 | A1 | 3/2010 |
| EP | 2501982 | A1 | 9/2012 |
| EP | 3513092 | A1 | 7/2019 |
| JP | 2000138988 | A | 5/2000 |
| WO | 2008148190 | A1 | 12/2008 |
| WO | 2011060529 | A1 | 5/2011 |

* cited by examiner

VIBRATION ISOLATOR AND AUDIO DEVICE

CROSS-REFERENCE TO RELATED APPLICATIONS

This application is a bypass continuation of International Patent Application No. PCT/CN2024/129163 filed Oct. 31, 2024, and claims priority to U.S. Patent Application No. 63/596,742 filed Nov. 7, 2023 and Chinese Patent Application No. 202411482892.3 filed Oct. 23, 2024, the disclosures of which are hereby incorporated by reference in their entireties.

BACKGROUND

Technical Field

The present application relates to the technical field of vibration isolators, and in particular, to a vibration isolator and an audio device.

Technical Considerations

Audio apparatus is a collective term for various devices or components used to process, transmit, and control audio signals. An audio apparatus generally comprises input devices, processing devices, transmission devices, storage devices, and output devices. The output devices typically include an audio amplifier and a speaker. The audio amplifier amplifies the power of audio signals to drive the speaker to produce sound at a sufficient volume. Audio amplifiers are categorized into power amplifiers and preamplifiers. Power amplifiers are primarily responsible for providing sufficient power output, whereas preamplifiers perform preliminary amplification and processing of audio signals, such as adjusting volume and tone. A speaker converts electrical signals into sound signals and serves as the final output component for audio playback. There are many types of speakers, including, for example, bookshelf speakers, floor-standing speakers, in-ceiling speakers, and headphones.

However, certain audio apparatuses generate significant vibrations during operation. These vibrations can cause distortion in the system that incorporates the audio apparatus, thereby adversely affecting the user experience.

SUMMARY

An objective of a non-limiting embodiment of the present application is to provide a vibration isolator and an audio device, which aims to address the technical problem that vibrations generated by an audio apparatus during operation cause distortion in a system incorporating the audio apparatus, thereby degrading the user experience.

To achieve the above objectives, according to one non-limiting aspect of the present application, a vibration isolator is provided. vibration isolator, configured to be installed between an audio apparatus and a substrate for decoupling vibrations transmitted from the audio apparatus to the substrate and separating vibrations transmitted from an external environment to the substrate from the audio apparatus. The vibration isolator comprises: a base assembly and a support assembly, a movable mounting part, and a damping part. The support assembly is installed in the base assembly, the base assembly is configured to be placed on the substrate, and the support assembly is configured to support the audio apparatus. The movable mounting part is mounted in the base assembly, and the support assembly is movably connected with the base assembly through the movable mounting part, or the support assembly is elastically connected with the base assembly through the movable mounting part, to allow the support assembly to be movable relative to the base assembly. The damping part is installed between the base assembly and the support assembly and configured to dampen the support assembly during a movement of the support assembly relative to the base assembly.

Optionally, the base assembly comprises a base body, an upper end of the base body defines a receiving recess, and the support assembly is at least partially disposed into the receiving recess. The damping part comprises an elastic damping member, which is installed between the base assembly and the support assembly and disposed in the receiving recess; during the movement of the support assembly relative to the base assembly, the elastic damping member is configured to abut against the support assembly and undergo elastic deformation under compression of the support assembly to dampen the support assembly.

Optionally, the elastic damping member is an annular member, an outer sidewall of the elastic damping member abuts against an inner sidewall of the receiving recess, the support assembly is disposed within the elastic damping member, an inner sidewall of the elastic damping member abuts against an outer sidewall of the support assembly; and during a lateral movement of the support assembly relative to the base assembly, the elastic damping member is configured to undergo elastic deformation under the compression of the support assembly to dampen the support assembly.

Optionally, the inner sidewall of the elastic damping member is gradually inclined radially outward from a first end of the elastic damping member to a second end of the elastic damping member. The support assembly has a connecting section, an outer sidewall of the connecting section is gradually inclined radially outward from a first end of the support assembly to a second end of the support assembly and abuts against the inner sidewall of the elastic damping member. The first end of the support assembly is an end of the support assembly that is close to the base body, and the first end of the elastic damping member is an end of the elastic damping member that is close to the base body.

Optionally, the vibration isolator further comprises a first anti-slip pad, the first anti-slip pad is arranged at the base assembly and at least partially protruding from a side of the base assembly away from the support assembly, the base assembly is configured to be placed on the substrate via the first anti-slip pad; and/or, the vibration isolator further comprises a second anti-slip pad, the second anti-slip pad is arranged on the support assembly and at least partially protruding from a side of the support assembly away from the base assembly, the support assembly is configured to support the audio apparatus via the second anti-slip pad.

Optionally, a first limiting structure is arranged at the inner sidewall of the receiving recess, and an outer sidewall of the support assembly is formed with a second limiting structure; and during the movement of support assembly away from the base assembly, the base assembly is configured to limit the movement of the support assembly away from the base assembly via cooperation between the first limiting structure and the second limiting structure.

Optionally, the support assembly is elastically connected with the base assembly through the movable mounting portion, the movable mounting portion further comprises an elastic support member, the elastic support member is installed in the receiving recess and located between the first end of the support assembly and a bottom wall of the receiving recess, and the first end of the support assembly abuts against the elastic support member, and the support assembly is configured to move relative to the base assembly by compressing the elastic support member and to cause the elastic support member to undergo elastic deformation.

Optionally, the support assembly is movably connected with the base assembly through the movable mounting part, the movable mounting part further comprises a rolling assembly, the rolling assembly is installed in the receiving recess and located between the first end of the support assembly and a bottom wall of the receiving recess, and the support assembly is in rolling connection with the base assembly through the rolling assembly.

Optionally, the support assembly is movably connected with the base assembly through the movable mounting part, the movable mounting part comprises a link assembly, a first end of the link assembly is pivotally connected to the first end of the support assembly, a second end of the link assembly is pivotally connected to the base assembly, and the support assembly is in oscillating connection with the base assembly through the link assembly.

According to another non-limiting aspect of the present application, an audio device is provided. The audio device comprises an audio apparatus, a substrate, and a vibration isolator. The vibration isolator is installed between the audio apparatus and the substrate, and the vibration isolator is the vibration isolator as described in the above.

The beneficial effects of the vibration isolator provided in the present application are summarized as follows: Compared with the prior art, in the vibration isolator provided in the present application, the movable mounting part is mounted in the base assembly, and the support assembly is movably or elastically connected with the base assembly via the movable mounting part. This allows the support assembly to be movably mounted in the base assembly. In the meanwhile, since the audio apparatus placed on the support assembly transmits vibration energy generated during operation to the support assembly, causing the support assembly to move relative to the base assembly, a damping part is disposed between the base assembly and the support assembly in the present non-limiting embodiment. This damping part increases damping the base assembly and the support assembly, enabling the vibration isolator to dissipate the vibration energy transmitted from the audio apparatus to the support assembly during the movement of the support assembly relative to the base assembly. Consequently, the damping part damps the support assembly, decouples vibrations transmitted from the audio apparatus to the support apparatus, and thereby mitigates the impact of the audio apparatus's vibration on the support apparatus, that is, the system incorporating the audio apparatus, thus enhancing the user experience.

BRIEF DESCRIPTION OF THE DRAWINGS

To more clearly illustrate the technical solutions of the non-limiting embodiments of the present application, the accompanying drawings to be used in the description of the non-limiting embodiments or the prior art will be briefly described below. Obviously, the drawings in the following description are merely some non-limiting embodiments of the present application. For a person having ordinary skill in the art, other drawings may be derived from these drawings without creative effort.

Figure 1:
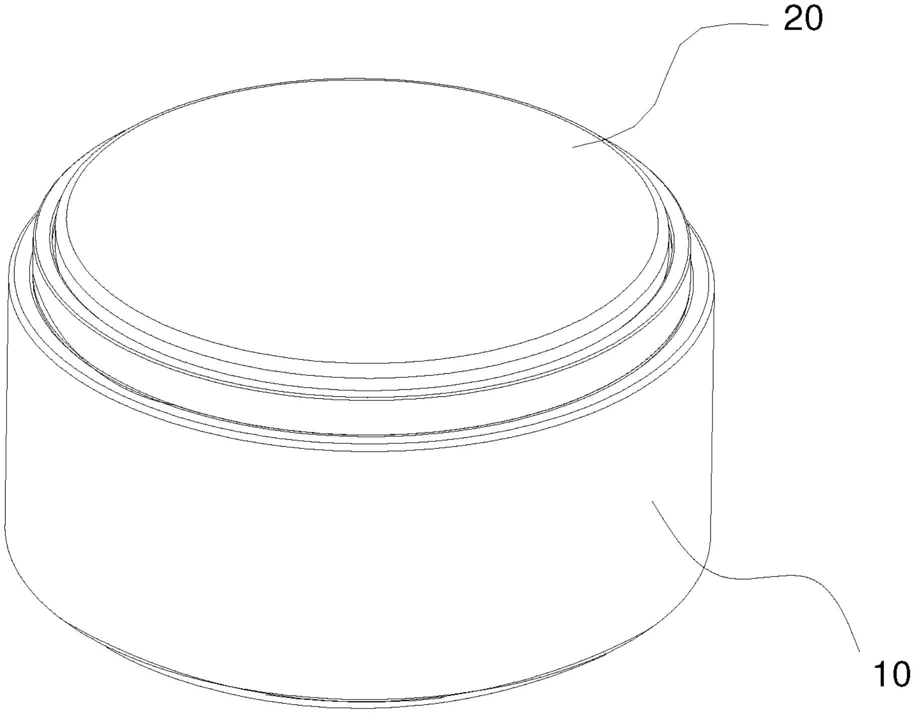
FIG. 1 is a structural schematic diagram of a vibration isolator provided in a non-limiting embodiment of the present application.

Reference numerals in the above figures are detailed as follows:

10. Base assembly; 11. Base body; 111. Receiving recess; 12. Annular support member; 121. Second pivot shaft;

20. Support assembly; 21. Support cover plate; 22. Limiting member; 221. Second limiting structure; 23. First pivot shaft;

31. Elastic support member; 32. First limiting ring; 33. Rolling assembly; 331. Ball; 332. Limiting plate; 34. Second limiting ring; 35. First retaining ring; 351. First limiting structure; 36. Link assembly; 361. Link body; 362. Arc-shaped bearing; 363. Second retaining ring; 364. Connecting screw; 365. Washer;

40. Elastic damping member;

50. First anti-slip pad; and

60. Second anti-slip pad.

DETAILED DESCRIPTION

In order to provide a clearer understanding of the technical problems, technical solutions, and beneficial effects to be solved by the present application clearer, the following detailed description is provided in conjunction with the accompanying drawings and non-limiting embodiments. It should be understood that the specific embodiments described herein are merely illustrative of the present application and are not intended to limit the scope of the present application.

It is to be noted that when an element is referred to as being "fixed to" or "mounted on" another element, it can be directly on or indirectly on that other element. When an element is referred to as being "connected to" another element, it can be directly connected to or indirectly connected to that other element. In the absence of conflicts, the embodiments and features of the embodiments in the present application may be combined with each other. The present application will now be described in detail below with reference to the drawings and in conjunction with the non-limiting embodiments.

It should be understood that the terms "length", "width", "upper", "lower", "front", "rear", "left", "right", "vertical", "horizontal", "top", "bottom", "inner", "outer", etc., indicate the orientation or positional relationship based on the orientation or positional relationship shown in the accompanying drawings. They are only for the convenience of describing the present application and simplifying the description, and do not indicate or imply that the device or element referred to must have a specific orientation, or be constructed and operated in a specific orientation. Therefore, they should not be construed as limitations on the present application.

Furthermore, the terms "first" and "second" are used for descriptive purposes only and should not be construed as indicating or implying relative importance or implicitly specifying the number of technical features indicated. Thus, a feature defined as "first" or "second" may explicitly or implicitly includes one or more of that feature. In the description of the present application, "a plurality of" means two or more, unless otherwise explicitly specified.

As noted in the background section, the term "audio apparatus" collectively refers to various devices or components utilized for processing, transmitting, and controlling audio signals. A typical audio apparatus comprises input devices, processing devices, transmission devices, storage devices, and output devices. The output devices generally include an audio amplifier and a speaker or speakers. The audio amplifier serves to amplify the power of the audio signal to drive the speakers to produce sound at a sufficient volume. Audio amplifiers are categorized into power amplifiers and preamplifiers: power amplifiers are primarily responsible for delivering sufficient power output, whereas preamplifiers perform preliminary amplification and processing of the audio signal, such as adjusting volume and tone. The speaker functions to convert electrical signals into sound waves, acting as the final output component for audio playback. Numerous types of speakers exist, including, but not limited to, bookshelf speakers, floor-standing speakers, in-ceiling speakers, and headphones. Nevertheless, certain audio apparatuses generate significant vibrations during operation. These vibrations can introduce distortion into the system incorporating the audio apparatus, thereby degrading the user experience.

Referring to FIGS. 1-15, to address the aforementioned problems, according to one non-limiting aspect of the present application, a non-limiting embodiment of the present application provides a vibration isolator. The vibration isolator is configured to be installed between an audio apparatus and a substrate for decoupling vibrations transmitted from the audio apparatus to the substrate and separating vibrations transmitted from an external environment to the substrate from the audio apparatus. The vibration isolator comprises: a base assembly 10 and a support assembly 20, a movable mounting part, and a damping part. The support assembly 20 is installed in the base assembly 10, the base assembly 10 is configured to be placed on the substrate, and the support assembly 20 is configured to support the audio apparatus. The movable mounting part is mounted in the base assembly 10, and the support assembly 20 is movably connected with the base assembly 10 through the movable mounting part, or the support assembly 20 is elastically connected with the base assembly 10 through the movable mounting part, to allow the support assembly 20 to be movable relative to the base assembly 10. The damping part is installed between the base assembly 10 and the support assembly 20 and configured to dampen the support assembly 20 during a movement of the support assembly 20 relative to the base assembly 10. In the vibration isolator provided in this embodiment of the present application, the movable mounting part is mounted in the base assembly 10, and the support assembly 20 is movably or elastically connected with the base assembly 10 via the movable mounting part. This allows the support assembly 20 to be movably mounted in the base assembly 10. In the meanwhile, since the audio apparatus placed on the support assembly 20 transmits vibration energy generated during operation to the support assembly 20, causing the support assembly 20 to move relative to the base assembly 10, a damping part is disposed between the base assembly 10 and the support assembly 20 in the present embodiment. This damping part increases damping the base assembly 10 and the support assembly 20, enabling the vibration isolator to dissipate the vibration energy transmitted from the audio apparatus to the support assembly 20 during the movement of the support assembly 20 relative to the base assembly 10. Consequently, the damping part damps the support assembly 20, decouples vibrations transmitted from the audio apparatus to the substrate, and thereby mitigates the impact of the audio apparatus's vibration on the substrate, that is, on the system incorporating the audio apparatus, thus enhancing the user experience.

Figure 2:
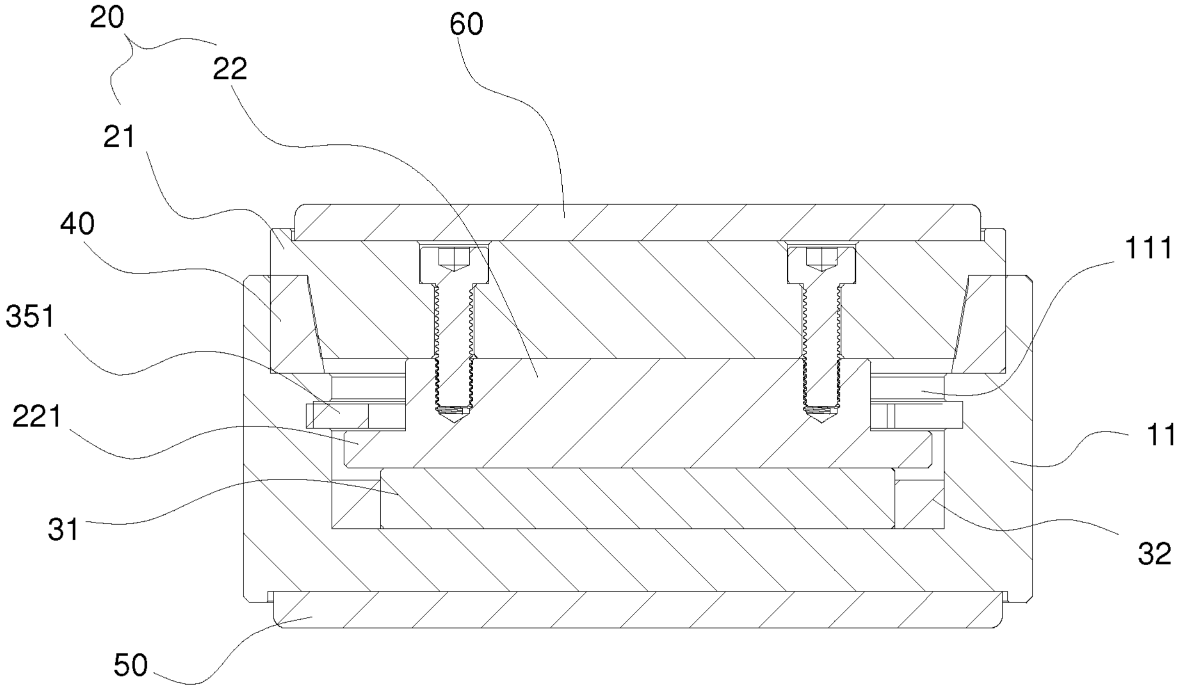
FIG. 2 is a cross-sectional schematic diagram of a vibration isolator with an elastic support member provided in a non-limiting embodiment of the present application.
Figure 3:
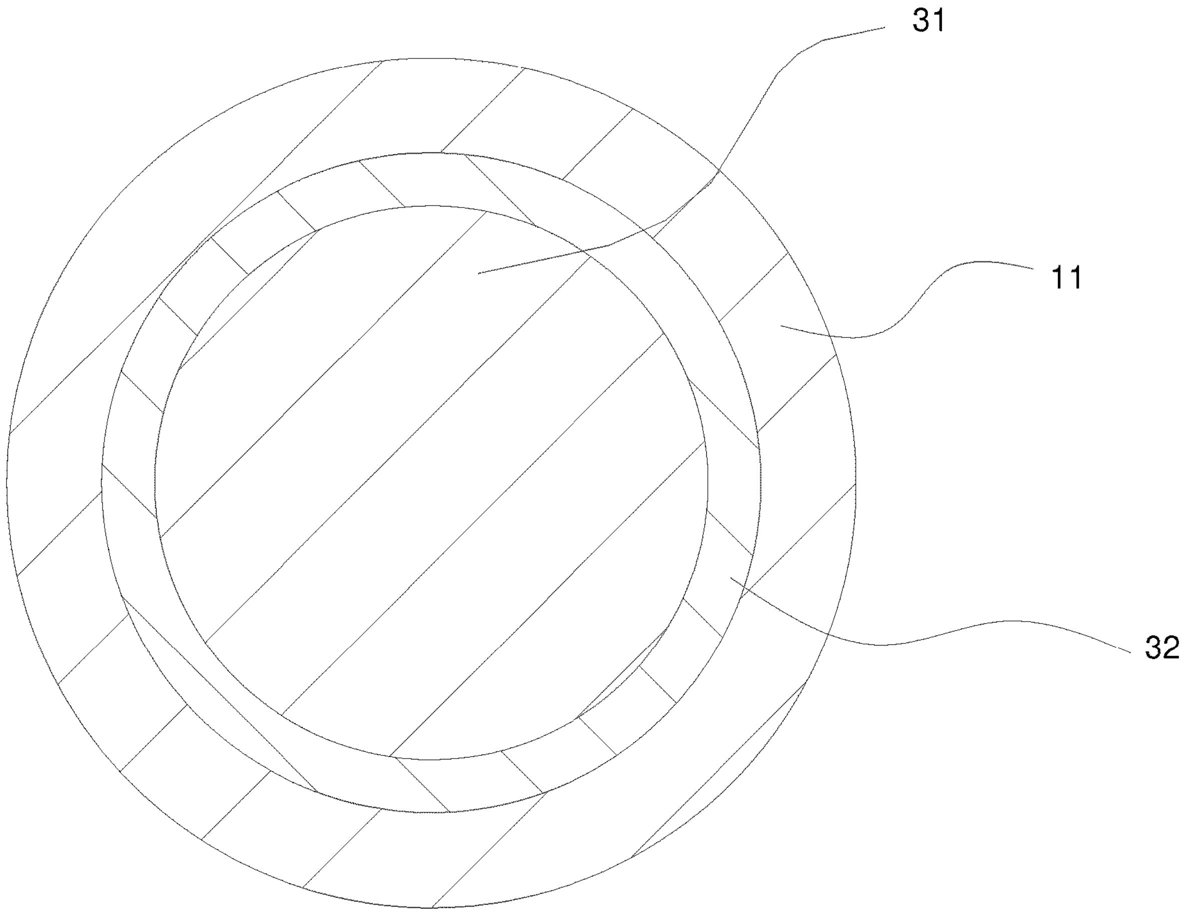
FIG. 3 is a cross-sectional schematic diagram of a vibration isolator with an elastic support member from another perspective provided in a non-limiting embodiment of the present application.
Figure 4:
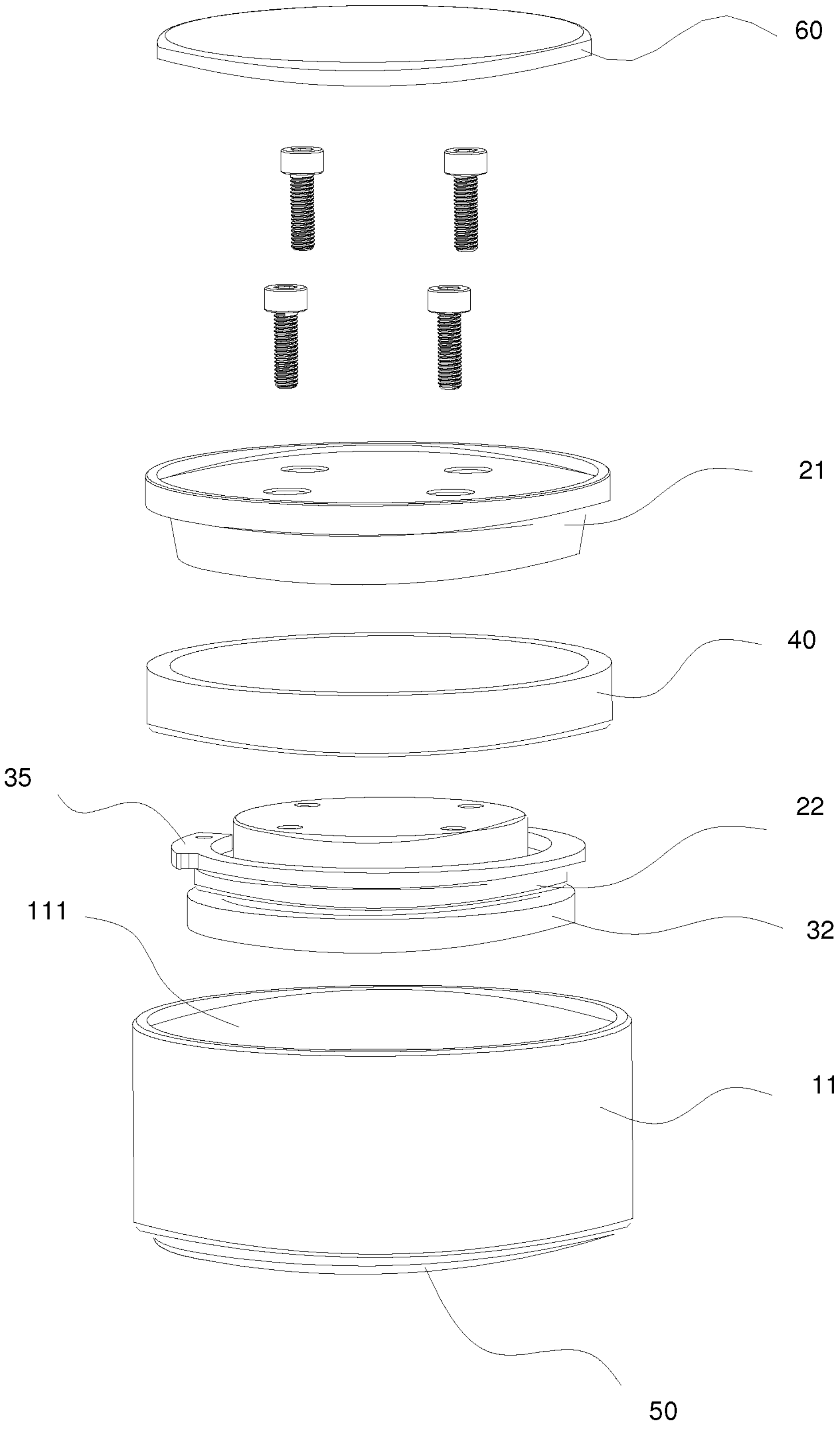
FIG. 4 is a partially exploded schematic diagram of a vibration isolator with an elastic support member provided in a non-limiting embodiment of the present application.
Figure 5:
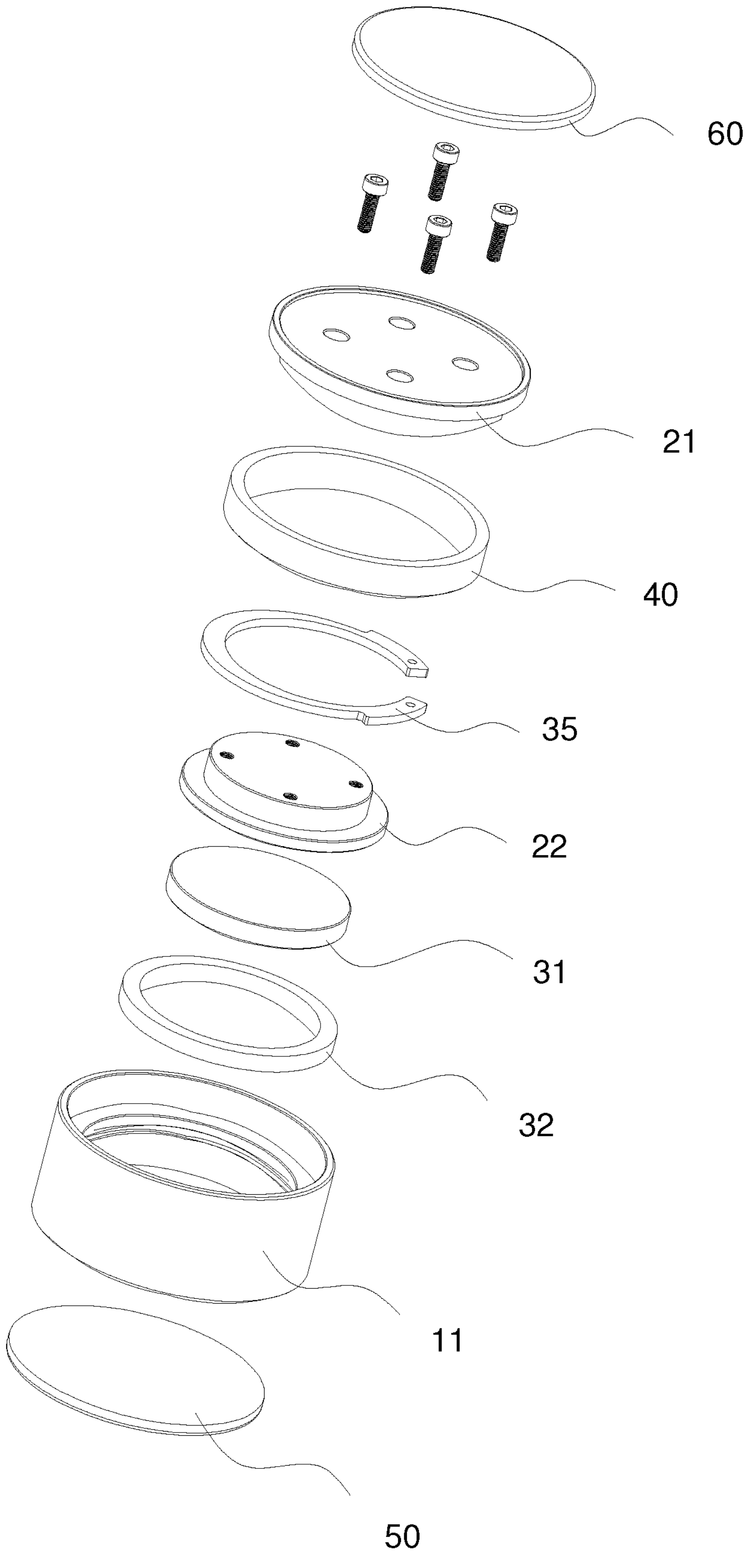
FIG. 5 is an exploded schematic diagram of a vibration isolator with an elastic support member provided in a non-limiting embodiment of the present application.
Figure 6:
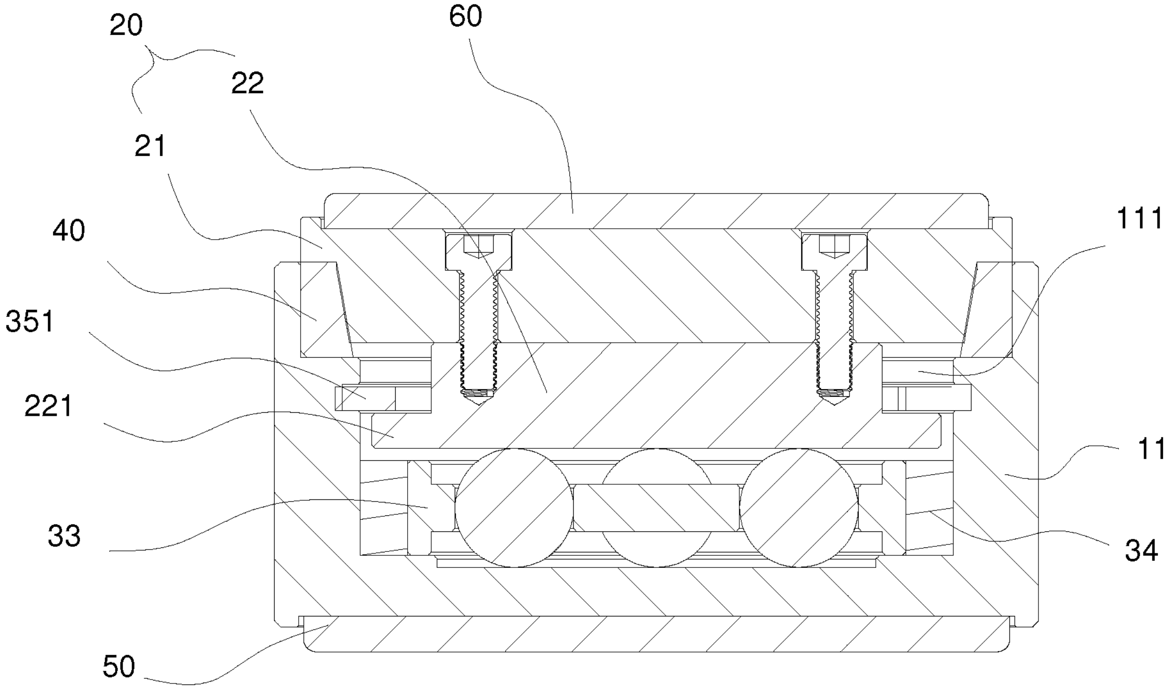
FIG. 6 is a cross-sectional schematic diagram of a vibration isolator with a rolling assembly provided in a non-limiting embodiment of the present application.
Figure 7:
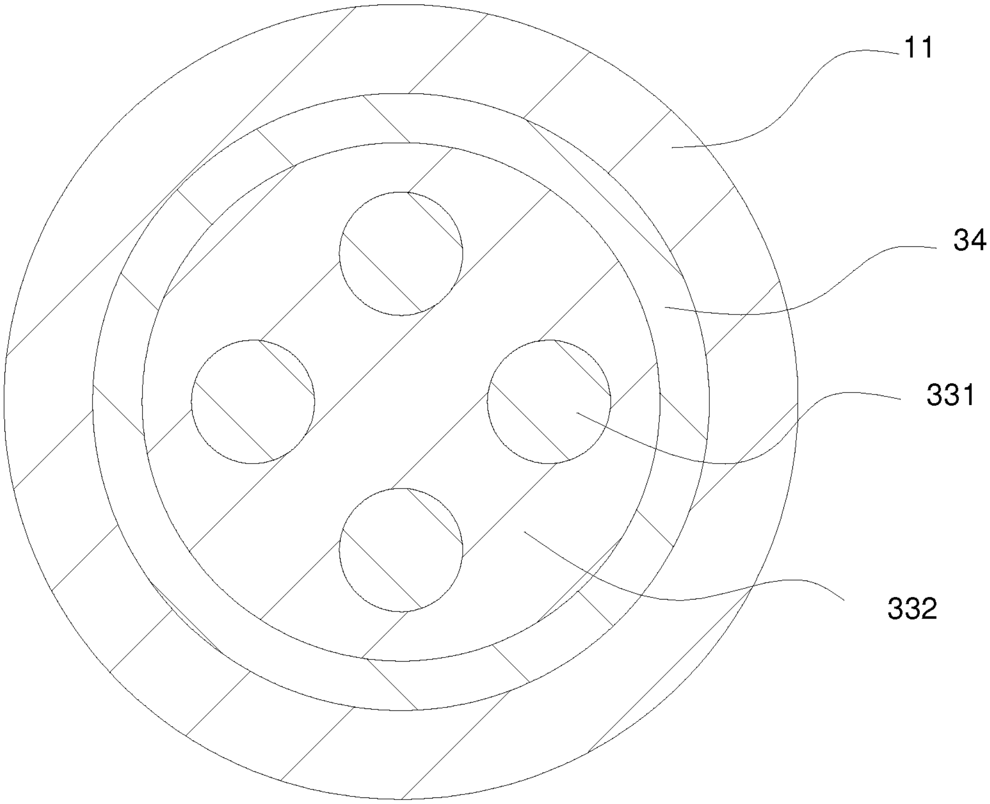
FIG. 7 is a cross-sectional schematic diagram of a vibration isolator with a rolling assembly from another perspective provided in a non-limiting embodiment of the present application.
Figure 8:
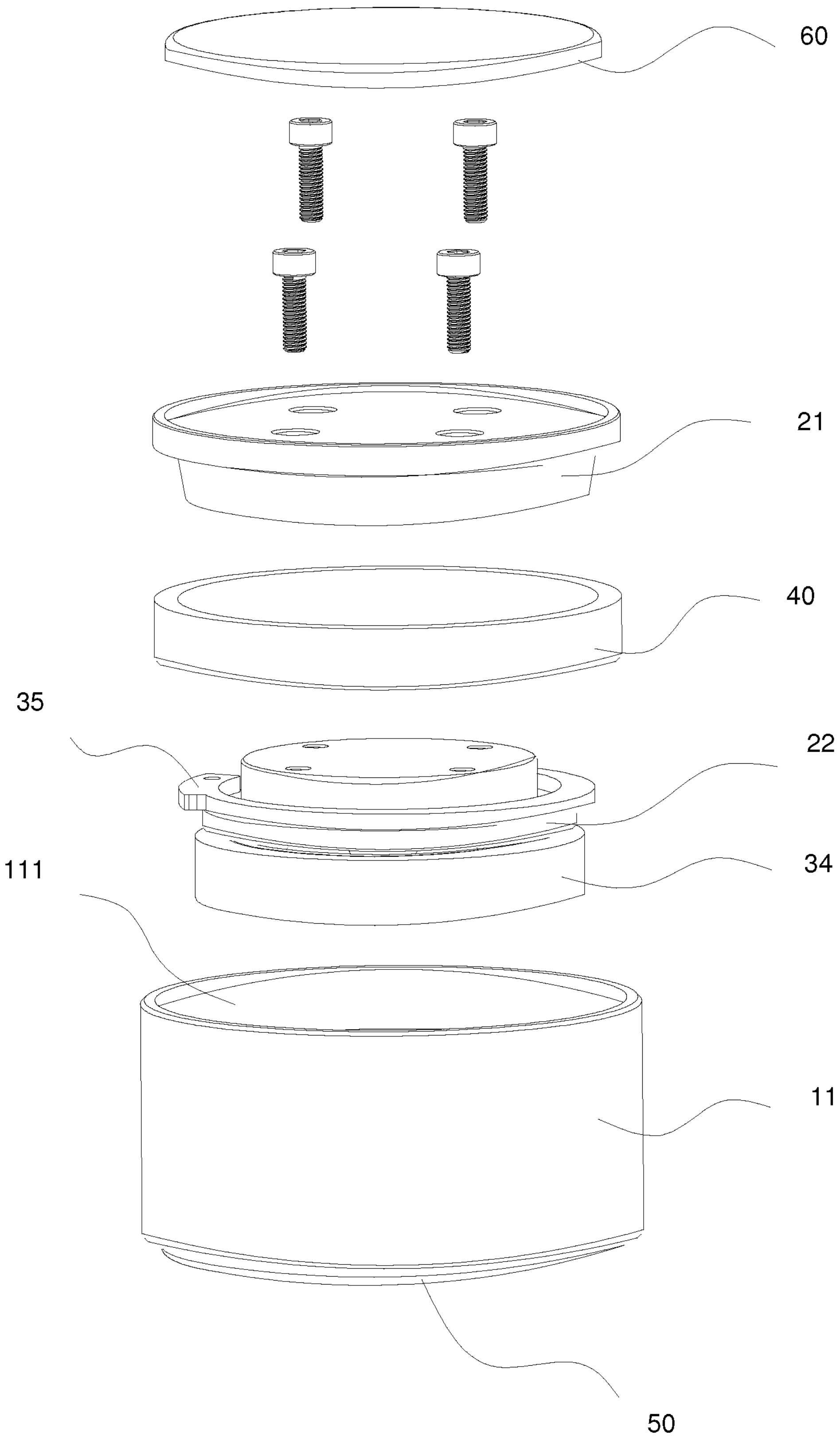
FIG. 8 is a partially exploded view of a vibration isolator with a rolling assembly provided in a non-limiting embodiment of the present application.
Figure 9:
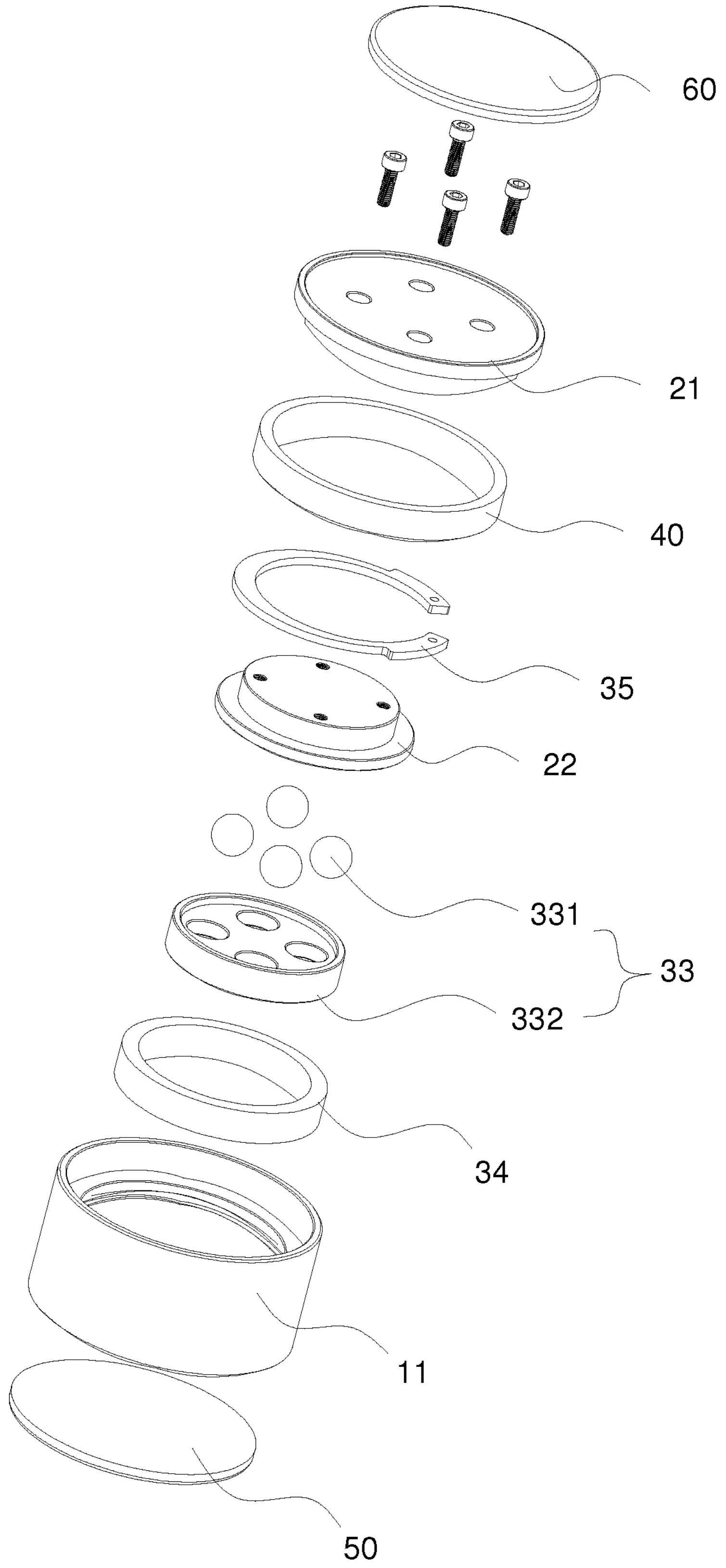
FIG. 9 is an exploded view of a vibration isolator with a rolling assembly according to a non-limiting embodiment of the present application.
Figure 10:
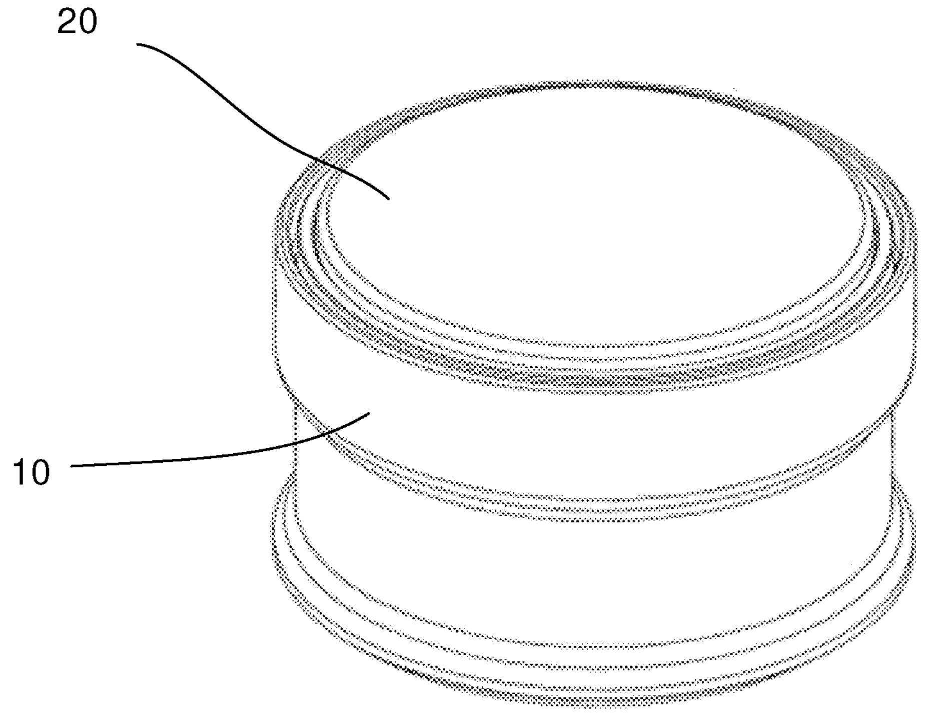
FIG. 10 is a structural schematic diagram of a vibration isolator with link assemblies according to a non-limiting embodiment of the present application.
Figure 11:
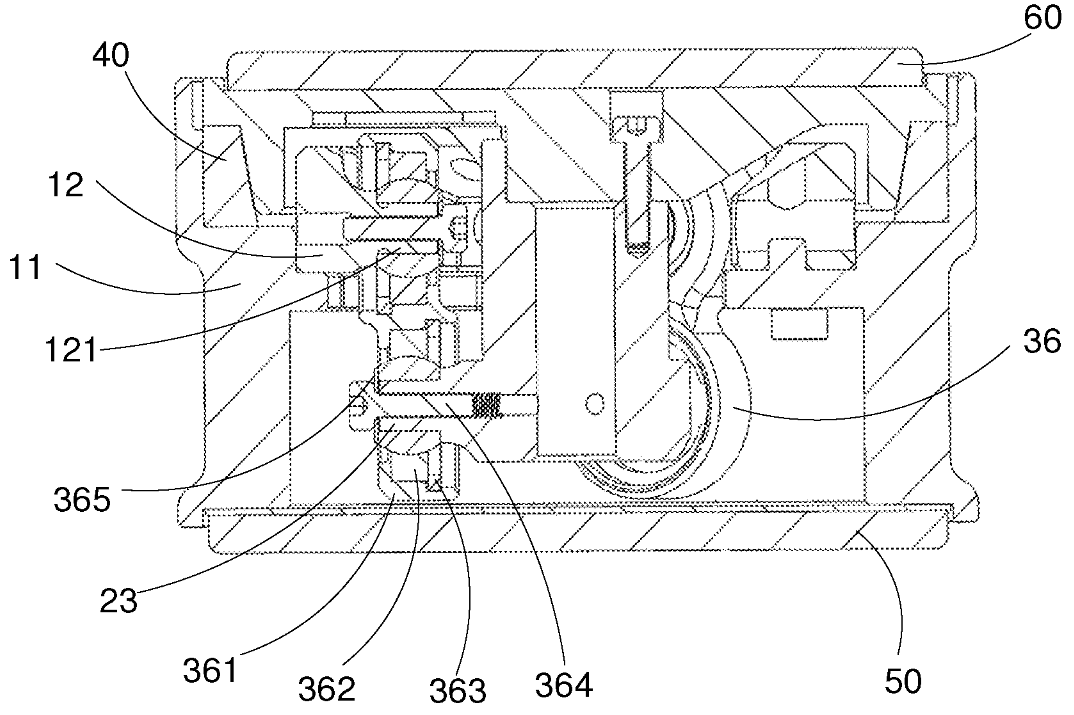
FIG. 11 is a cross-sectional schematic diagram of a vibration isolator with link assemblies according to a non-limiting embodiment of the present application.
Figure 12:
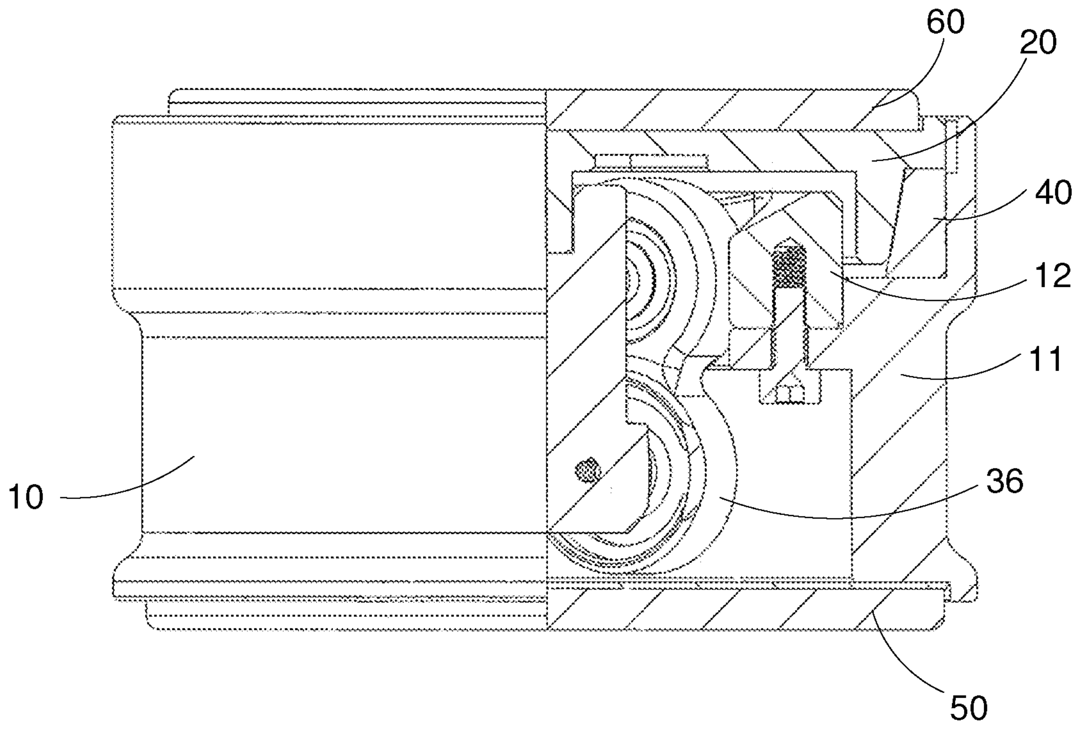
FIG. 12 is a cross-sectional schematic diagram of a vibration isolator with link assemblies from another perspective according to a non-limiting embodiment of the present application.
Figure 13:
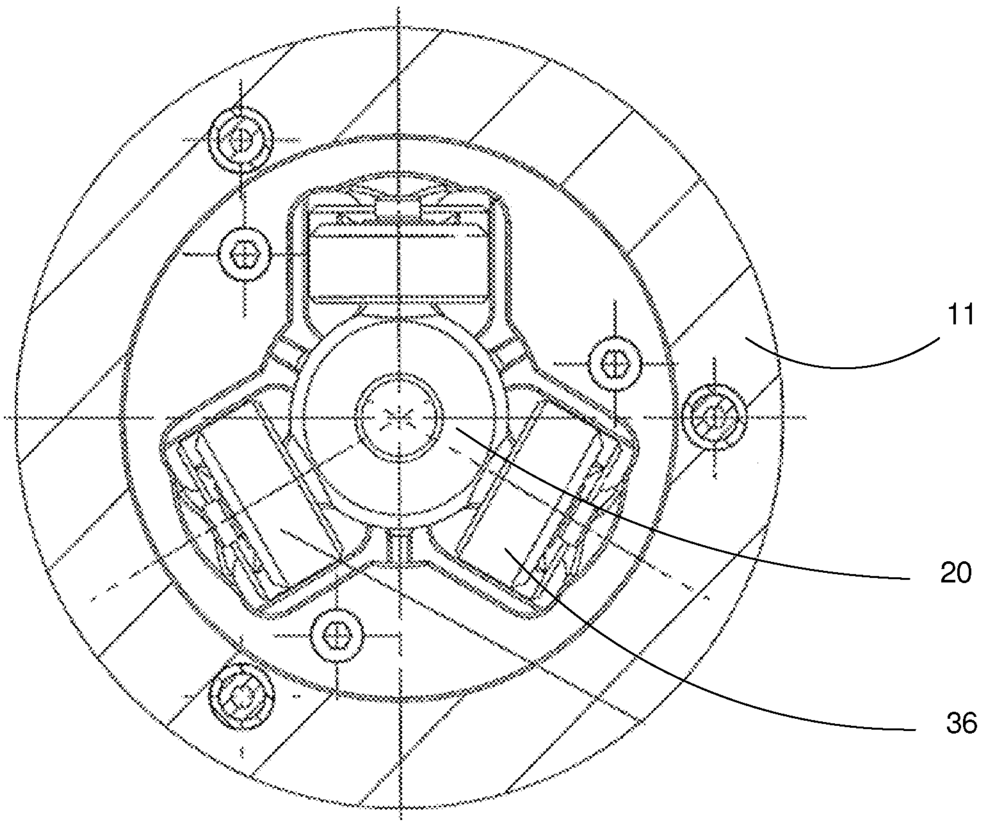
FIG. 13 is a cross-sectional schematic diagram of a vibration isolator with link assemblies from yet another perspective according to a non-limiting embodiment of the present application.
Figure 14:
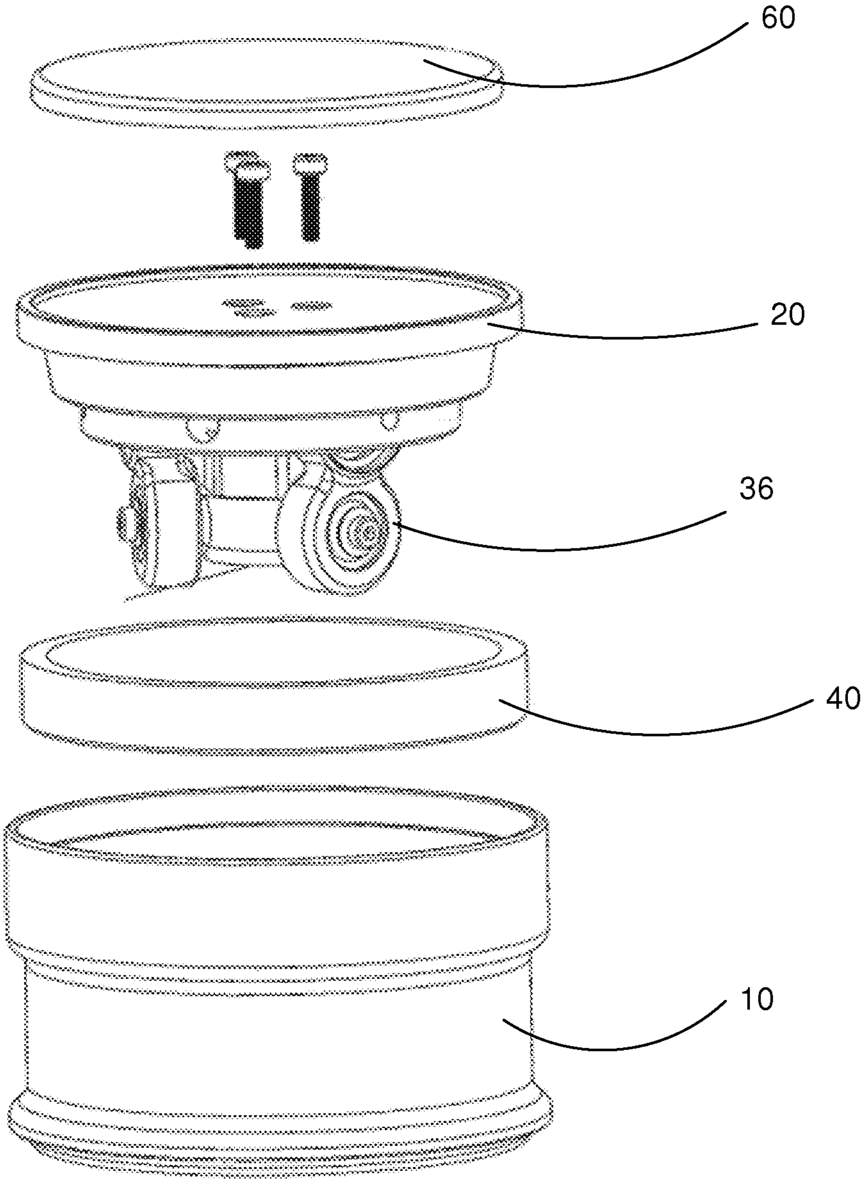
FIG. 14 is a partially exploded view of a vibration isolator with link assemblies according to a non-limiting embodiment of the present application.
Figure 15:
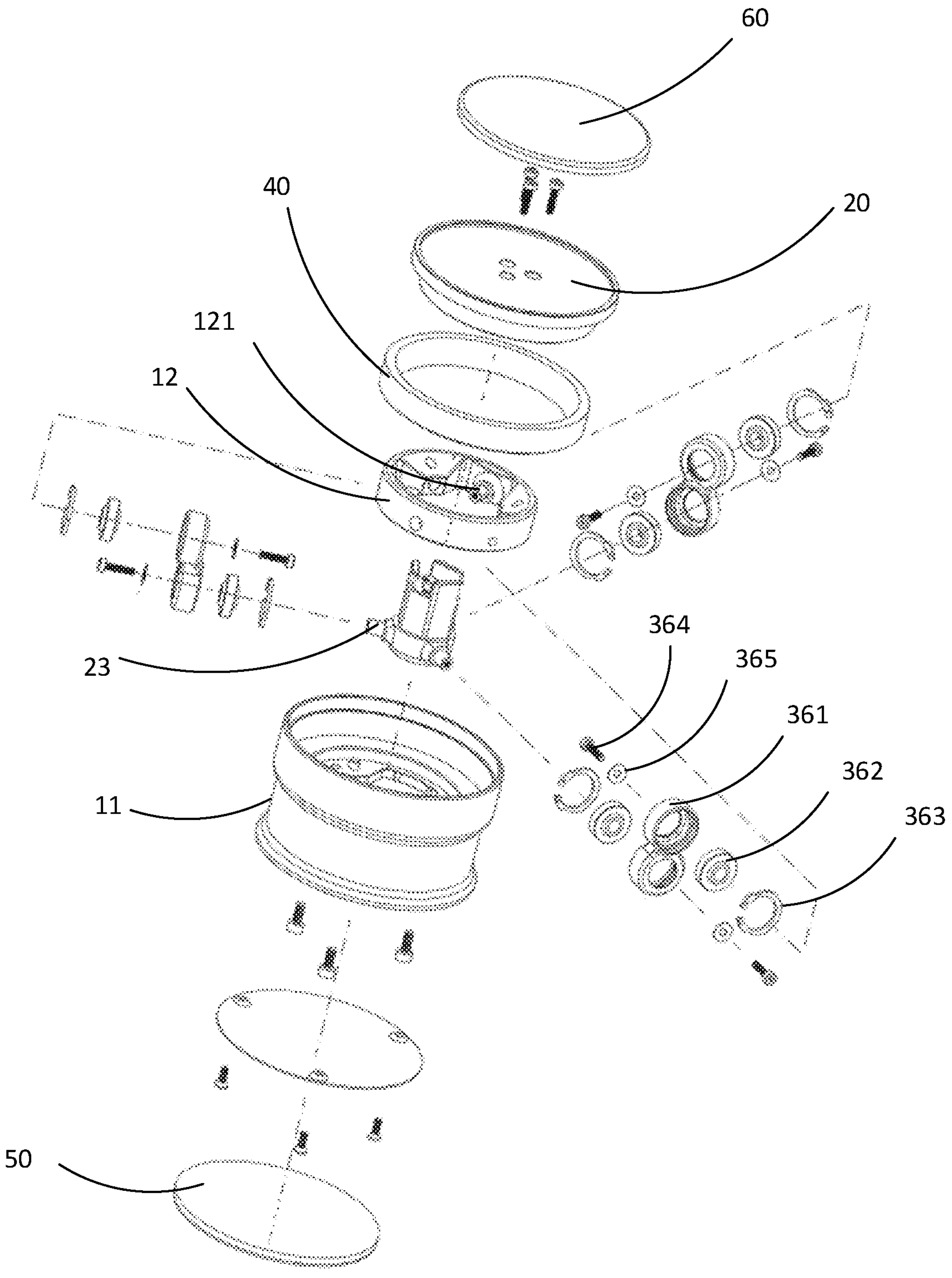
FIG. 15 is an exploded view of a vibration isolator with link assemblies according to a non-limiting embodiment of the present application.

Referring to FIGS. 2 and 6, in a specific non-limiting embodiment, the base assembly 10 comprises a base body 11, an upper end of the base body 11 defines a receiving recess 111, and the support assembly 20 is at least partially disposed into the receiving recess 111. The damping part comprises an elastic damping member 40, which is installed between the base assembly 10 and the support assembly 20 and disposed in the receiving recess 111; during the movement of the support assembly 20 relative to the base assembly 10, the elastic damping member 40 is configured to abut against the support assembly 20 and undergo elastic deformation under compression of the support assembly 20 to dampen the support assembly 20. In this embodiment, the elastic damping member 40 is installed between the base assembly 10 and the support assembly 20 and the elastic damping member 40 and is disposed within the receiving recess 111, with such an arrangement, the vibration isolator can dissipate the vibration energy transmitted from the audio apparatus to the support assembly 20 through the elastic deformation of the elastic damping member 40, thereby achieving vibration damping of the support assembly 20.

In an optional non-limiting embodiment, the base body 11 provided in this embodiment is made of metal.

Referring to FIGS. 2, 4-6, and 8-9, in a specific non-limiting embodiment, the elastic damping member 40 is an annular member, an outer sidewall of the elastic damping member 40 abuts against an inner sidewall of the receiving recess 111, the support assembly 20 is disposed within the elastic damping member 40, an inner sidewall of the elastic damping member 40 abuts against an outer sidewall of the support assembly 20; and during a lateral movement of the support assembly 20 relative to the base assembly 10, the elastic damping member 40 is configured to undergo elastic deformation under the compression of the support assembly 20 to dampen the support assembly 20. In this embodiment, the elastic damping member 40 is constructed as an annular member, the outer sidewall of the elastic damping member 40 abuts against the inner sidewall of the receiving recess 111, and the support assembly 20 is disposed within the elastic damping member 40, and the inner sidewall of the elastic damping member 40 abuts against the outer sidewall of the support assembly 20, with such an arrangement, the vibration isolator provided in this embodiment can dissipate the vibration energy transmitted from the audio apparatus to the support assembly 20 through the elastic deformation of the elastic damping member 40 during the lateral movement of the support assembly 20 relative to the base assembly 10 induced by the vibration energy of the audio apparatus, thereby decoupling the lateral vibration transmitted from the audio apparatus to the substrate and thus achieving vibration damping of the support assembly 20.

In an optional non-limiting embodiment, an upper end of the base body 11 provided in this embodiment has a first sidewall, the first sidewall is enclosed to form a first recess, the elastic damping member 40 provided in this embodiment is installed in the first recess, a bottom wall of the elastic damping member 40 is connected with a bottom wall of the first recess, and an inner sidewall of the first recess is connected with the outer sidewall of the elastic damping member 40.

In an optional non-limiting embodiment, the outer sidewall of the connecting section provided in this embodiment is adapted to the inner sidewall of the elastic damping member 40.

In an optional non-limiting embodiment, the first sidewall provided in this embodiment is annular.

In an optional non-limiting embodiment, the bottom wall of the first recess provided in this embodiment further defines therein a second recess, and the second recess and the first recess together form the receiving recess 111.

In an optional non-limiting embodiment, the lateral direction provided in this embodiment is perpendicular to a height direction of the base assembly. In other non-limiting embodiments, the lateral direction provided in this embodiment can also be other directions.

Referring to FIGS. 2, 4-6, and 8-9, in a specific non-limiting embodiment, the inner sidewall of the elastic damping member 40 is gradually inclined radially outward from a first end of the elastic damping member 40 to a second end of the elastic damping member 40. The support assembly 20 has a connecting section, an outer sidewall of the connecting section is gradually inclined radially outward from a first end of the support assembly 20 to a second end of the support assembly 20 and abuts against the inner sidewall of the elastic damping member 40. The first end of the support assembly 20 is an end of the support assembly 20 that is close to the base body 11, and the first end of the elastic damping member 40 is an end of the elastic damping member 40 that is close to the base body 11. In this embodiment, the inner sidewall of the elastic damping member 40 is constructed to be gradually inclined radially outward from the first end of the elastic damping member 40 to the second end of the elastic damping member 40, and the outer sidewall of the connecting section is constructed to be gradually inclined radially outward from the first end of the support assembly 20 to the second end of the support assembly 20 and abuts against the inner sidewall of the elastic damping member 40, in this way, the contact area between the elastic damper 40 and the support assembly 20 can be increased, so that the vibration energy transmitted to the support assembly 20 can be fully dissipated.

Referring to FIGS. 2, 4-6, and 8-9, in a specific non-limiting embodiment, the vibration isolator further comprises a first anti-slip pad 50, the first anti-slip pad 50 is arranged at the base assembly 10 and at least partially protruding from a side of the base assembly 10 away from the support assembly 20, the base assembly 10 is configured to be placed on the substrate via the first anti-slip pad 50; and/or, the vibration isolator further comprises a second anti-slip pad 60, the second anti-slip pad 60 is arranged on the support assembly 20 and at least partially protruding from a side of the support assembly 20 away from the base assembly 10, the support assembly 20 is configured to support the audio apparatus via the second anti-slip pad 60. In this embodiment, the base assembly 10 is provided with the first anti-slip pad 50, which at least partially protrudes from a side of the base assembly 10 away from the support assembly 20, such that the base assembly 10 provided in this embodiment can be placed on the substrate via the first anti-slip pad 50. By the arrangement of the first anti-slip pad 50, the friction between the vibration isolator provided in this embodiment and the substrate can be effectively increased, thereby preventing the vibration isolator from sliding on the substrate.

In an optional non-limiting embodiment, the base assembly 10 provided in this embodiment defines a first mounting groove at a side thereof away from the support assembly 20. The first anti-slip pad 50 provided in this embodiment is installed in the first mounting groove and at least partially protrudes from the first mounting groove.

In another optional non-limiting embodiment, the first anti-slip pad 50 provided in this embodiment is fixedly connected to the base assembly 10 by adhesive bonding.

In an optional non-limiting embodiment, the first anti-slip pad 50 provided in this embodiment is made of an elastic material, such as rubber.

In another optional non-limiting embodiment, the support assembly 20 provided in this embodiment defines a second mounting groove at a side thereof away from the base assembly 10. The second anti-slip pad 60 provided in this embodiment is installed in the second mounting groove and at least partially protrudes from the second mounting groove.

In an optional non-limiting embodiment, the second anti-slip pad 60 provided in this embodiment is fixedly connected to the support assembly 20 by adhesive bonding.

In another optional non-limiting embodiment, the material of the second anti-slip pad 60 provided in this embodiment is an elastic material, such as rubber.

In an optional non-limiting embodiment, the vibration isolator provided in this embodiment further comprises a second anti-slip pad 60. The second anti-slip pad 60 is arranged on the support assembly 20 and at least partially protrudes from the side of the support assembly 20 away from the base assembly 10, and the support assembly 20 is configured to support the audio apparatus via the second anti-slip pad 60.

By providing the second anti-slip pad 60 on the support assembly 20 and making the second anti-slip pad at least partially protrude from the side of the support assembly 20 away from the base assembly 10, the support assembly 20 provided in this embodiment can support the audio apparatus through the second anti-slip pad 60. By the arrangement of the second anti-slip pad 60, the friction between the vibration isolator and the audio apparatus provided in this embodiment can be effectively increased, thereby preventing the audio apparatus from sliding on the vibration isolator.

Referring to FIGS. 2, 4-6, and 8-9, in a specific non-limiting embodiment, a first limiting structure 351 is arranged at the inner sidewall of the receiving recess 111, and an outer sidewall of the support assembly 20 is formed with a second limiting structure 221. During the movement of support assembly 20 away from the base assembly 10, the base assembly 10 is configured to limit the movement of the support assembly 20 away from the base assembly 10 via cooperation between the first limiting structure 351 and the second limiting structure 221. By providing the first limiting structure 351 on the inner sidewall of the receiving recess 111 and forming the second limiting structure 221 on the outer sidewall of the support assembly 20, the base assembly 10 provided in this embodiment can limit the movement of the support assembly 20 in the direction away from the base assembly 10 through the cooperation of the first limiting structure 351 and the second limiting structure 221.

In an optional non-limiting embodiment, the support assembly 20 provided in this embodiment comprises a support cover plate 21 and a limiting member 22. The limiting member 22 provided in this embodiment is installed on a side of the support cover plate 21 near the base body 11 and is arranged in the receiving recess 111. An outer sidewall of an end of the limiting member 22 away from the support cover plate 21 has a limiting flange. The limiting flange provided in this embodiment forms a second limiting structure 221.

In an optional non-limiting embodiment, an end of the support cover plate 21 near the limiting member 22 forms a connecting section.

In another optional non-limiting embodiment, a diameter of the end of the support cover plate 21 away from the limiting member 22 is larger than a maximum diameter of the connecting section.

In an optional non-limiting embodiment, the support cover plate 21 and the limiting member 22 provided in this embodiment are connected by threaded fasteners.

In another optional non-limiting embodiment, the support assembly 20 provided in this embodiment further comprises a first connecting bolt. The support cover plate 21 provided in this embodiment defines therein a first through hole, and the limiting member 22 defines therein a first threaded hole. A position of the first threaded hole aligns with a position of the first through hole. The first connecting bolt provided in this embodiment passes through the first through hole and threaded into the first threaded hole to fixedly connect the support cover plate 21 and the limiting member 22 together.

In an optional non-limiting embodiment, a plurality of first connecting bolts, a plurality of first through holes, and a plurality of first threaded holes are provided. The plurality of first through holes are circumferentially spaced apart on the support cover plate 21. The plurality of first threaded holes and the plurality of first through holes are in one-to-one correspondence, and the plurality of first connecting bolts likewise and the plurality of first threaded holes are in one-to-one correspondence.

In an optional non-limiting embodiment, the first through hole provided in this embodiment is a stepped hole, and an end of the first bolt away from the limiting member 22 is located within the stepped hole.

In another optional non-limiting embodiment, the movable mounting part provided in this embodiment comprises a first retaining ring 35. A first annular groove is provided on the inner sidewall of the receiving recess 111 provided in this embodiment. The first retaining ring 35 is installed in the first annular groove and at least partially extends into the receiving recess 111. The first retaining ring 35 located within the receiving recess 111 forms a first limiting structure 351. The first retaining ring 35 is located on the side of the limiting flange away from the base body 11. When the support assembly 20 provided in this embodiment moves away from the base assembly 10, the first retaining ring 35 can engage with the limiting flange to limit the movement of the support assembly 20.

In an optional non-limiting embodiment, the first retaining ring 35 and the limiting member 22 provided in this embodiment have a lateral movable gap, allowing the support assembly 20 to move laterally relative to the base assembly 10.

Referring to FIGS. 2-5, in a specific non-limiting embodiment, the support assembly 20 is elastically connected with the base assembly 10 through the movable mounting portion, the movable mounting portion further comprises an elastic support member 31, the elastic support member 31 is installed in the receiving recess 111 and located between the first end of the support assembly 20 and a bottom wall of the receiving recess 111, and the first end of the support assembly 20 abuts against the elastic support member 31, and the support assembly 20 is configured to move relative to the base assembly 10 by compressing the elastic support member 31 and to cause the elastic support member 31 to undergo elastic deformation. In this embodiment, the elastic support member 31 is installed in the receiving recess 111 and located between the first end of the support assembly 20 and the bottom wall of the receiving recess 111, and the first end of the support assembly 20 abuts against the elastic support member 31, such that the support assembly 20 provided by this embodiment can move relative to the base assembly 10 by compressing the elastic support member 31 and cause the elastic support member 31 to undergo elastic deformation.

In an optional non-limiting embodiment, the movable mounting part provided in this embodiment further comprises a first limiting ring 32. The first limiting ring 32 provided in this embodiment is installed in the receiving recess 111 and is located between the first end of the support assembly 20 and the bottom wall of the receiving recess 111. The flexible elastic pad provided in this embodiment is installed in the first limiting ring 32. An end of the flexible elastic pad near the support assembly 20 protrudes at least partially from the side of the first limiting ring 32 near the support assembly 20, so that the flexible elastic pad can abut against the support assembly 20.

In an optional non-limiting embodiment, during the movement of the support assembly 20 provided in this embodiment toward the base assembly 10 induced by the vibration energy of the audio apparatus, the movement of the support assembly 20 can dissipate the vibration energy transmitted from the audio apparatus to the support assembly 20 via the elastic deformation of the flexible elastic pad, thereby decoupling the longitudinal vibration transmitted from the audio apparatus to the substrate.

In an optional non-limiting embodiment, the longitudinal direction provided in this embodiment is parallel to the height direction of the base assembly 10. In other embodiments, the longitudinal direction provided in this embodiment can also be other directions.

Referring to FIGS. 6 to 9, in another non-limiting embodiment, the support assembly 20 is movably connected with the base assembly 10 through the movable mounting part, the movable mounting part further comprises a rolling assembly 33, the rolling assembly 33 is installed in the receiving recess 111 and located between the first end of the support assembly 20 and a bottom wall of the receiving recess 111, and the support assembly 20 is in rolling connection with the base assembly 10 through the rolling assembly 33. In this embodiment, the rolling assembly 33 is installed in the receiving recess 111 and located between the first end of the support assembly 20 and the bottom wall of the receiving recess 111, such that the support assembly 20 is in rolling connection with the base assembly 10 through the rolling assembly 33, thereby enabling the support assembly 20 to slide relative to the base assembly 10.

In an optional non-limiting embodiment, the rolling assembly 33 provided in this embodiment comprises a ball 331 and a limiting plate 332. The limiting plate 332 provided in this embodiment is installed in the receiving recess 111 and is located between the first end of the support assembly 20 and the bottom wall of the receiving recess 111. The limiting plate 332 extends laterally and is provided with a mounting hole extending longitudinally. The ball 331 is rotatable installed in the mounting hole. The upper end of the ball 331 protrudes at least partially from the side of the limiting plate 332 near the support assembly 20 and abuts against the first end of the support assembly 20. The lower end of the ball 331 abuts against the bottom wall of the receiving recess 111.

In an optional non-limiting embodiment, a plurality of balls 331 and a plurality of mounting holes provided in this embodiment are provided, with the plurality of mounting holes spaced apart circumferentially along the limiting plate 332, and the plurality of ball 331 respectively corresponds to plurality of multiple mounting holes.

In another optional non-limiting embodiment, four balls 331 and four mounting holes are provided in this embodiment, with the four mounting holes spaced apart circumferentially along the limiting plate 332, and the four balls 331 respectively corresponds to the four mounting holes.

In an optional non-limiting embodiment, the ball 331 provided in this embodiment is a spherical component.

In another optional non-limiting embodiment, the support assembly 20 provided in this embodiment can move laterally relative to the base assembly 10 via the balls 331. During the lateral movement of the support assembly 20 relative to the base assembly 10 caused by the vibration energy of the audio apparatus, the movement of the support assembly 20 can dissipate the vibration energy transmitted from the audio apparatus to the support assembly 20 through the elastic deformation of the elastic damping member 40, thus decoupling the lateral vibration transmitted from the audio apparatus to the substrate.

In an optional non-limiting embodiment, the movable mounting part provided in this embodiment further comprises a second limiting ring 34. The second limiting ring 34 provided in this embodiment is installed in the receiving recess 111 and is located between the first end of the support assembly 20 and the bottom wall of the receiving recess 111. The limiting plate 332 provided in this embodiment is installed in the second limiting ring 34, and a height of the second limiting ring 34 is flush with a height of the limiting plate 332.

Referring to FIGS. 10-15, in another non-limiting embodiment, the support assembly 20 is movably connected with the base assembly 10 through the movable mounting part, the movable mounting part comprises a link assembly 36, a first end of the link assembly 36 is pivotally connected to the first end of the support assembly 20, a second end of the link assembly 36 is pivotally connected to the base assembly 10, and the support assembly 20 is in oscillating connection with the base assembly 10 through the link assembly 36. In this embodiment, the first end of the link assembly 36 is pivotally connected to the first end of the support assembly 20, the second end of the link assembly 36 is pivotally connected to the base assembly 10, such that the support assembly 20 provided in this embodiment can be in oscillating connection with the base assembly 10 through the link assembly 36.

In an optional non-limiting embodiment, the movable mounting part provided in this embodiment comprises a plurality of link assemblies 36, which are spaced apart circumferentially along the support assembly 20.

In another optional non-limiting embodiment, the movable mounting part provided in this embodiment comprises three link assemblies 36, which are spaced apart circumferentially along the support assembly 20.

In an optional non-limiting embodiment, the base body 11 provided in this embodiment has a first opening on the side away from the support assembly 20. The first opening communicates with the receiving recess 111. The first opening provided in this embodiment also comprises a base plate. The base plate provided in this embodiment covers the first opening and is in fixed connection with the base body 11.

In an optional non-limiting embodiment, the support cover plate 21 provided in this embodiment defines a relief recess in a side thereof near the base assembly 10, the relief recess being used to allow clearance for the link assembly 36.

In another optional non-limiting embodiment, in a case where a plurality of link assemblies 36 are provided in this embodiment, a plurality of relief recesses are provided in this embodiment, the plurality of link assemblies 36 and the plurality of relief recesses are in one-to-one correspondence; or alternatively, the relief recess provided in this embodiment is an annular groove, and the annular groove corresponds to the plurality of link assemblies 36.

In an optional non-limiting embodiment, the base assembly 10 provided in this embodiment further comprises an annular support member 12. The annular support member 12 provided in this embodiment is installed in the receiving recess 111. An end of the annular support member 12 near the support assembly 20 is at least partially located in the relief recess. A first pivot shaft 23 is formed an outer sidewall of the first end of the support assembly 20 provided in this embodiment. A first pivot hole is defined in the first end of the link assembly 36. The first end of the link assembly 36 is pivotally connected to the base assembly 10 through the first pivot hole and the first pivot shaft 23. A second pivot shaft 121 is formed on an inner sidewall of the annular support member 12 provided in this embodiment. A second pivot hole is defined in the second end of the link assembly 36. The second end of the link assembly 36 is pivotally connected to the support assembly 20 through the second pivot hole and the second pivot shaft 121. A height of the first end of the link assembly 36 is higher than a height of the second end of the link assembly 36.

In an optional non-limiting embodiment, each link assembly 36 provided in this embodiment comprises a link body 361 and two arc-shaped bearings 362. Both ends of the link body 361 defines therein bearing mounting holes, respectively. The two arc-shaped bearings 362 provided in this embodiment are respectively installed in the two bearing mounting holes, respectively. An outer sidewall of an outer ring of the arc-shaped bearing 362 provided in this embodiment is arc-shaped. An inner sidewall of the bearing mounting hole is adapted to the outer sidewall of the outer ring of the arc-shaped bearing 362. The first pivot hole or the second pivot hole is defined in the inner ring of each of the two arc-shaped bearings 362. Through the cooperation between each bearing mounting hole and the corresponding arc-shaped bearing 362, the axis of the first pivot hole or the second pivot hole can be inclined relative to the link body 361.

In an optional non-limiting embodiment, the link assembly 36 provided in this embodiment further comprises a second retaining ring 363, which is installed in the bearing mounting hole to limit an axial movement of the outer ring of the arc-shaped bearing 362.

In another optional non-limiting embodiment, the link assembly 36 provided in this embodiment further comprises a connecting screw 364 and a washer 365. An end of the first pivot shaft 23 or the second pivot shaft 121 provided in this embodiment defines therein a connecting threaded hole. The connecting screw 364 is screwed into the connecting threaded hole, and the washer 365 is clamped between the first pivot shaft 23 and the connecting screw 364, or between the second pivot shaft 121 and the connecting screw 364, to limit an axial movement of the inner ring of the arc-shaped bearing 362.

In a specific non-limiting embodiment, since the axis of the first pivot hole and the axis of the second pivot hole provided in this embodiment can be inclined relative to the link body 361, the support assembly 20 can have a relatively wide range of motion relative to the base assembly 10.

In an optional non-limiting embodiment, the support assembly 20 provided in this embodiment can move relative to the base assembly 10 via the link assembly 36. During the movement of the support assembly 20 relative to the base assembly 10 caused by the vibration energy of the audio apparatus, the movement of the support assembly 20 can dissipate the vibration energy transmitted from the audio apparatus to the support assembly 20 through the elastic deformation of the elastic damping member 40, thus decoupling the vibration transmitted from the audio apparatus to the substrate.

According to another non-limiting aspect of the present application, an audio device is provided. The audio device comprises: an audio apparatus, a substrate, and a vibration isolator. The vibration isolator is installed between the audio apparatus and the substrate, and the vibration isolator is the vibration isolator as described in the above.

In an optional non-limiting embodiment, the audio device provided in this embodiment comprises multiple vibration isolators, and the audio apparatus provided in this embodiment is supported by multiple vibration isolators simultaneously.

In an optional non-limiting embodiment, the substrate provided in this embodiment is a support apparatus capable of supporting the audio apparatus. It should be understood that in other embodiments, the substrate provided in this embodiment may also be formed by the ground.

In summary, the vibration isolator and audio device provided by non-limiting embodiments of the present application have at least the following beneficial technical effects: in the vibration isolator provided by non-limiting embodiments of the present application, the movable mounting part is mounted in the base assembly 10, and the support assembly 20 is movably or elastically connected with the base assembly 10 via the movable mounting part. This allows the support assembly 20 to be movably mounted in the base assembly 10. In the meanwhile, since the audio apparatus placed on the support assembly 20 transmits vibration energy generated during operation to the support assembly 20, causing the support assembly 20 to move relative to the base assembly 10, a damping part is disposed between the base assembly 10 and the support assembly 20 in the present non-limiting embodiment. This damping part increases damping the base assembly 10 and the support assembly 20, enabling the vibration isolator to dissipate the vibration energy transmitted from the audio apparatus to the support assembly 20 during the movement of the support assembly 20 relative to the base assembly 10.

Consequently, the damping part damps the support assembly 20, decouples vibrations transmitted from the audio apparatus to the substrate, and thereby mitigates the impact of the audio apparatus's vibration on the substrate, that is, on the system incorporating the audio apparatus, thus enhancing the user experience.

The above are merely preferred embodiments of the present application and are not intended to limit the present application. Any modifications, equivalent substitutions, and improvements made within the spirit and principles of the present application should be comprised within the protection scope of the present application.

What is claimed is:

1. A vibration isolator, configured to be installed between an audio apparatus and a substrate for decoupling vibrations transmitted from the audio apparatus to the substrate and separating vibrations transmitted from an external environment to the substrate from the audio apparatus, wherein the vibration isolator comprises:

a base assembly and a support assembly, wherein the support assembly is installed in the base assembly, the base assembly is configured to be placed on the substrate, and the support assembly is configured to support the audio apparatus;

a movable mounting part, wherein the movable mounting part is mounted in the base assembly, and the support assembly is movably connected with the base assembly through the movable mounting part, or the support assembly is elastically connected with the base assembly through the movable mounting part, to allow he support assembly to be movable relative to the base assembly; and a damping part, wherein the damping part is installed between the base assembly and the support assembly and configured to dampen the support assembly during a movement of the support assembly relative to the base assembly.

2. The vibration isolator according to claim 1, wherein the base assembly comprises a base body, an upper end of the base body defines a receiving recess, and the support assembly is at least partially disposed into the receiving recess; and the damping part comprises an elastic damping member, which is installed between the base assembly and the support assembly and disposed in the receiving recess; during the movement of the support assembly relative to the base assembly, the elastic damping member is configured to abut against the support assembly and undergo elastic deformation under compression of the support assembly to dampen the support assembly.

3. The vibration isolator according to claim 2, wherein the elastic damping member is an annular member, an outer sidewall of the elastic damping member abuts against an inner sidewall of the receiving recess, the support assembly is disposed within the elastic damping member, an inner sidewall of the elastic damping member abuts against an outer sidewall of the support assembly; and during a lateral movement of the support assembly relative to the base assembly, the elastic damping member is configured to undergo elastic deformation under the compression of the support assembly to dampen the support assembly.

4. The vibration isolator according to claim 3, wherein the inner sidewall of the elastic damping member is gradually inclined radially outward from a first end of the elastic damping member to a second end of the elastic damping member;

the support assembly has a connecting section, an outer sidewall of the connecting section is gradually inclined radially outward from a first end of the support assembly to a second end of the support assembly and abuts against the inner sidewall of the elastic damping member; and wherein, the first end of the support assembly is an end of the support assembly that is close to the base body, and the first end of the elastic damping member is an end of the elastic damping member that is close to the base body.

5. The vibration isolator according to claim 2, wherein the vibration isolator further comprises at least one of the following:

(i) a first anti-slip pad, the first anti-slip pad is arranged at the base assembly and at least partially protruding from a side of the base assembly away from the support assembly, the base assembly is configured to be placed on the substrate via the first anti-slip pad;

(ii) the vibration isolator further comprises a second anti-slip pad, the second anti-slip pad is arranged on the support assembly and at least partially protruding from a side of the support assembly away from the base assembly, the support assembly is configured to support the audio apparatus via the second anti-slip pad or any combination thereof.

6. The vibration isolator according to claim 2, wherein a first limiting structure is arranged at the inner sidewall of the receiving recess, and an outer sidewall of the support assembly is formed with a second limiting structure; and during the movement of support assembly away from the base assembly, the base assembly is configured to limit the movement of the support assembly away from the base assembly via cooperation between the first limiting structure and the second limiting structure.

7. The vibration isolator according to claim 2, wherein the support assembly is elastically connected with the base assembly through the movable mounting portion, the movable mounting portion further comprises an elastic support member, the elastic support member is installed in the receiving recess and located between the first end of the support assembly and a bottom wall of the receiving recess, and the first end of the support assembly abuts against the elastic support member, and the support assembly is configured to move relative to the base assembly by compressing the elastic support member and to cause the elastic support member to undergo elastic deformation.

8. The vibration isolator according to claim 2, wherein the support assembly is movably connected with the base assembly through the movable mounting part, the movable mounting part further comprises a rolling assembly, the rolling assembly is installed in the receiving recess and located between the first end of the support assembly and a bottom wall of the receiving recess, and the support assembly is in rolling connection with the base assembly through the rolling assembly.

9. The vibration isolator according to claim 2, wherein the support assembly is movably connected with the base assembly through the movable mounting part, the movable mounting part comprises a link assembly, a first end of the link assembly is pivotally connected to the first end of the support assembly, a second end of the link assembly is pivotally connected to the base assembly, and the support assembly is in oscillating connection with the base assembly through the link assembly.

10. An audio device, comprising an audio apparatus, a substrate, and a vibration isolator according to claim 1, wherein the vibration isolator is installed between the audio apparatus and the substrate.

11. The audio device according to claim 10, wherein the base assembly comprises a base body, an upper end of the base body defines a receiving recess, and the support assembly is at least partially disposed into the receiving recess; and the damping part comprises an elastic damping member, which is installed between the base assembly and the support assembly and disposed in the receiving recess; during the movement of the support assembly relative to the base assembly, the elastic damping member is configured to abut against the support assembly and undergo elastic deformation under compression of the support assembly to dampen the support assembly.

12. The vibration isolator according to claim 11, wherein the elastic damping member is an annular member, an outer sidewall of the elastic damping member abuts against an inner sidewall of the receiving recess, the support assembly is disposed within the elastic damping member, an inner sidewall of the elastic damping member abuts against an outer sidewall of the support assembly; and during a lateral movement of the support assembly relative to the base assembly, the elastic damping member is configured to undergo elastic deformation under the compression of the support assembly to dampen the support assembly.

13. The vibration isolator according to claim 12, wherein the inner sidewall of the elastic damping member is gradually inclined radially outward from a first end of the elastic damping member to a second end of the elastic damping member;

the support assembly has a connecting section, an outer sidewall of the connecting section is gradually inclined radially outward from a first end of the support assembly to a second end of the support assembly and abuts against the inner sidewall of the elastic damping member; and wherein, the first end of the support assembly is an end of the support assembly that is close to the base body, and the first end of the elastic damping member is an end of the elastic damping member that is close to the base body.

14. The vibration isolator according to claim 11, wherein the vibration isolator further comprises at least one of the following:

(i) a first anti-slip pad, the first anti-slip pad is arranged at the base assembly and at least partially protruding from a side of the base assembly away from the support assembly, the base assembly is configured to be placed on the substrate via the first anti-slip pad;

(ii) the vibration isolator further comprises a second anti-slip pad, the second anti-slip pad is arranged on the support assembly and at least partially protruding from a side of the support assembly away from the base assembly the support assembly is configured to support the audio apparatus via the second anti-slip pad or any combination thereof.

15. The vibration isolator according to claim 11, wherein a first limiting structure is arranged at the inner sidewall of the receiving recess, and an outer sidewall of the support assembly is formed with a second limiting structure; and during the movement of support assembly (20) away from the base assembly the base assembly is configured to limit the movement of the support assembly away from the base assembly via cooperation between the first limiting structure and the second limiting structure.

16. The vibration isolator according to claim 11, wherein the support assembly is elastically connected with the base assembly through the movable mounting portion, the movable mounting portion further comprises an elastic support member, the elastic support member is installed in the receiving recess and located between the first end of the support assembly and a bottom wall of the receiving recess, and the first end of the support assembly abuts against the elastic support member, and the support assembly is configured to move relative to the base assembly by compressing the elastic support member and to cause the elastic support member to undergo elastic deformation.

17. The vibration isolator according to claim 11, wherein the support assembly is movably connected with the base assembly through the movable mounting part, the movable mounting part further comprises a rolling assembly, the rolling assembly is installed in the receiving recess and located between the first end of the support assembly and a bottom wall of the receiving recess, and the support assembly is in rolling connection with the base assembly through the rolling assembly.

18. The vibration isolator according to claim 11, wherein the support assembly is movably connected with the base assembly through the movable mounting part, the movable mounting part comprises a link assembly, a first end of the link assembly is pivotally connected to the first end of the support assembly, a second end of the link assembly is pivotally connected to the base assembly, and the support assembly is in oscillating connection with the base assembly through the link assembly.

* * * * *